Sept. 22, 1931.   J. C. McCUNE   1,824,053
STRAIGHT AIR EMERGENCY VALVE DEVICE
Filed April 1, 1929

INVENTOR
JOSEPH C. McCUNE
BY Wm. N. Cady
ATTORNEY

Patented Sept. 22, 1931

1,824,053

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

STRAIGHT AIR EMERGENCY VALVE DEVICE

Application filed April 1, 1929. Serial No. 351,495.

This invention relates to fluid pressure brake equipments and more particularly to such equipments in which emergency valve devices are employed for controlling the application and release of the brakes.

Heretofore emergency valve devices have been employed having an application portion and an emergency portion, the application portion being operative to directly control the supply of fluid under pressure to the brake cylinder in effecting both service and emergency applications of the brakes and to directly control the discharge of fluid under pressure from the brake cylinder in effecting the release of the brakes after such applications. Since the emergency portion of this type of emergency valve device cannot operate to supply fluid under pressure directly to the brake cylinder, and such supply is wholly dependent upon the operation of the application portion, failure of said application portion to operate to application position when it is desired to effect an emergency application of the brakes, will prevent the desired supply of fluid under pressure to the brake cylinder even though the emergency portion does operate to its emergency position, so that the brakes could not be applied to retard the movement of the car.

The principal object of my invention is to provide an improved emergency valve device of the above type which will be free from the objectionable feature just described in connection with the emergency valve devices heretofore used.

Another object of my invention is to provide an improved emergency valve device having an application portion and an emergency portion, either or both of which are operative to supply fluid under pressure to the brake cylinder to effect an emergency application of the brakes.

Another object of my invention is to provide an improved emergency valve device having an application portion and an emergency portion for controlling the application and release of the brakes, and in which the emergency portion is adapted to control the discharge of fluid under pressure from the brake cylinder in effecting the release of the brakes.

A further object of my invention is to provide an improved emergency valve device having an application portion and an emergency portion either or both of which are operative to control the opening and closing of communication from the brake cylinder to the atmosphere.

Other objects and advantages will appear in the following more detailed description of my invention.

Figure 1:
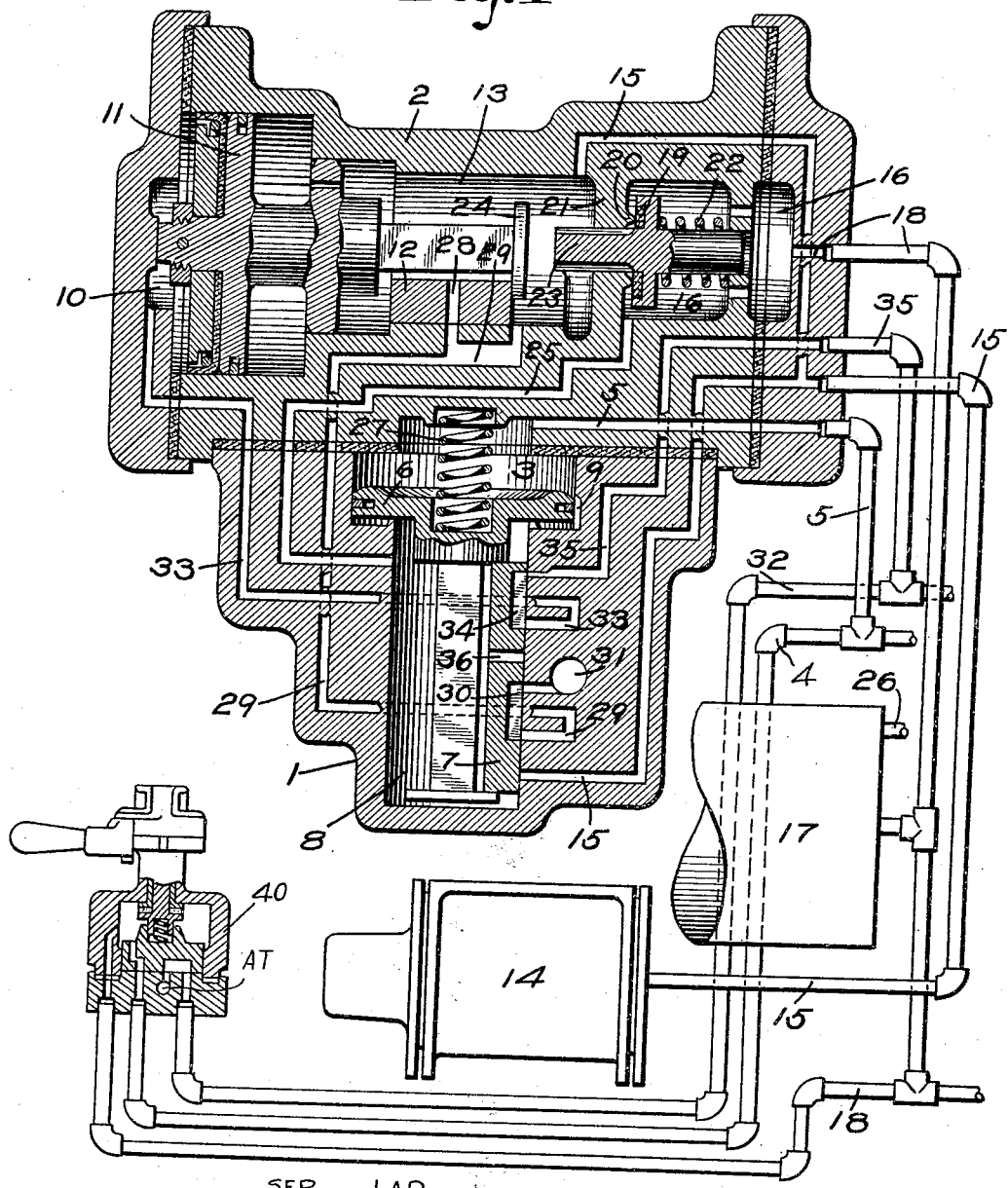
Figure 2:
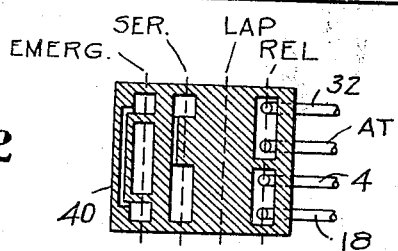

In the accompanying drawings, Fig. 1 is a diagrammatic view, mainly in section, of a portion of a brake equipment having an emergency valve device embodying my invention; and Fig. 2 is a development view of the brake valve device.

As shown in the accompanying drawings, my improved emergency valve device comprises an emergency portion 1 and an application portion 2.

The emergency portion 1 may comprise a casing having a chamber 3 connected to an emergency pipe 4 through a passage and pipe 5 and containing an emergency piston 6 which is adapted to operate an emergency slide valve 7 contained in a chamber 8, said chambers 3 and 8 being connected together, when the emergency piston is in release position, through the usual feed groove 9.

The application portion 2 may comprise a casing having a chamber 10 containing an application piston 11 which is adapted to operate a slide valve 12 contained in a chamber 13 which is connected to a brake cylinder 14 through a passage and pipe 15. The passage 15 also leads from the seat of the emergency slide valve 7.

Contained in a chamber 16, in the application portion 2, which is connected to a reservoir 17 through a passage and pipe 18, is a fluid pressure supply valve 19 which is normally maintained sealed against a seat ring 20, formed on a wall 21 of the casing, by the pressure of a spring 22. The valve 19 is provided with a fluted stem 23 which extends through an opening formed in the casing wall 21, and into the valve chamber 13. Within the valve chamber 13, the end of the stem 23 is adapted to be engaged by the end 24 of the stem of the application piston 11.

The valve chamber 16 in the application portion is constantly connected to the reservoir 17 through the pipe and passage 18 and the valve chamber 8 in the emergency portion is constantly connected to the valve chamber 16 through a passage 25.

In initially charging the equipment, fluid under pressure is supplied to the reservoir 17 through a pipe 26 leading from a fluid pressure compressor or other pressure supply source, (not shown) to the emergency valve chamber 8 through pipe and passage 18, valve chamber 16 in the application portion and passage 25. At the same time fluid under pressure is supplied from the reservoir 17 to the emergency piston chamber 3 through pipe 18, the usual brake valve device 40, emergency pipe 4, and pipe and passage 5. Since the pressures in chambers 3 and 8 will be substantially equal, the pressure of a spring 27, contained in the chamber 3, maintains the emergency piston and emergency slide valve in their lowermost or release positions as shown in the drawings.

With the emergency slide valve 7 and the application slide valve 12 in their release positions, the brake cylinder 14 is connected to the atmosphere through pipe and passage 15, application slide valve chamber 13, past the end of the slide valve 12 and through a port 28 in the slide valve 12, a passage 29, a cavity 30 in the emergency slide valve 7 and passage 31.

Further, with the emergency slide valve 7 in release position, the application piston chamber 10 is connected to the straight air pipe 32 through a passage 33, a cavity 34 in the emergency slide valve 7 and a passage and pipe 35. With the brake valve device in release position the straight air pipe is connected to the atmosphere in the usual manner through the brake valve device.

With the equipment thus fully charged and the brake cylinder connected to the atmosphere, to effect a service application of the brakes, the straight air pipe 32 is supplied with fluid under pressure from the reservoir 17 through the pipe 18 and brake valve device in the usual manner, and fluid thus supplied flows from the pipe 32 to the application piston chamber 10, through pipe and passage 35, cavity 34 in the emergency slide valve 7 and passage 33.

Pressure of fluid thus supplied to the application piston chamber 10, causes the application piston 11 to move in the direction toward the right hand to its application position, carrying with it the application slide valve 12 to its application position, in which position the slide valve closes off the communication from the brake cylinder 14 and application slide valve chamber 13 to the atmosphere.

Before the application piston 11 reaches its application position, the end 24 of the piston stem engages the end of the fluted stem 23 of the supply valve 19, and the continued movement of the piston, toward application position, causes the valve 19 to be unseated from the seat ring 20, against the pressure of the spring 22, thus establishing communication through which fluid under pressure, from the reservoir 17, and present in valve chamber 16, flows to the application valve chamber 13 and from thence to the brake cylinder 14 through passage 15.

Now, when the brake cylinder pressure, present in the application slide valve chamber 13 becomes substantially equal to the pressure of fluid in the application piston chamber 10, i. e., when a full service application of the brakes has been effected, the pressure of spring 22 causes the valve 19 to again seat against the seat ring 20. While this valve is moving to its seated position, the end of the fluted stem, being in engagement with the end 24 of the valve stem, causes the application piston 11 and application slide valve 12 to move in a direction toward the left hand, a distance corresponding to the travel of the valve 19, but this movement is not sufficient to again establish the communication from the brake cylinder and valve chamber 13 to the atmosphere, thus maintaining brake cylinder pressure.

Should it be desired to limit the brake cylinder pressure in effecting an application of the brakes, the pressure of fluid, in the straight air pipe 32, and consequently in the application piston chamber 10, is built up to the desired degree, causing the application portion 2 to function to supply fluid under pressure as described in connection with a service application of the brakes, until such time as the pressures in the chambers 10 and 13 become substantially equal, when the valve 19 will be seated in the manner hereinbefore described and close off the further supply of fluid under pressure to the brake cylinder 14.

To release the brakes after a service application, the straight air pipe 32 is vented to the atmosphere through the brake valve device in the usual manner, and as a consequence, the application piston chamber 10 is also vented to the atmosphere, since this piston chamber is connected with the straight air pipe through the passage 33, cavity 34 in the emergency slide valve 7 and passage and pipe 35.

When the pressure of fluid from the piston chamber is thus discharged, the pressure of fluid in the application slide valve chamber 13 causes the application piston 11 to return to release position, as shown in the drawings, carrying with it the application slide valve 12 to its release position. With the slide valve 12 returned to release position, it reestablishes the communication, through which, fluid under pressure is discharged from the brake cylinder 14 to the atmosphere.

To effect an emergency application of the brakes, the emergency pipe 4 is vented to the atmosphere through the brake valve device in the usual manner, and as a consequence the emergency piston chamber 3 is also vented to the atmosphere, since said chamber is connected to the pipe 4 by the passage and pipe 5. With the piston chamber 3 thus vented, the pressure of fluid in the emergency valve chamber 8, as supplied from the reservoir 17, through pipe and passage 18, valve chamber 16 in the application portion and passage 25, causes the emergency piston 6 to move to its uppermost or emergency position, against the pressure of the spring 27, carrying with it, the emergency slide valve 7.

With the emergency slide valve 7 in emergency position, a port 36 in said valve registers with the passage 33, so that fluid under pressure flows from the emergency valve chamber 8 to the application piston chamber 10, through said port and passage. The pressure thus supplied to the chamber 10 causes the application portion 2 to operate to supply fluid under pressure from the reservoir 17 to the brake cylinder, and to close the communication from the brake cylinder 14 and chamber 13 to the passage 29, in the same manner as described in connection with the effecting of a service application of the brakes.

When the emergency slide valve 7 is being operated to emergency position, the communication from the passage 29 to the atmospheric passage, by way of the cavity 30, in the emergency slide valve 7, is closed off, and the communication from the passage 35 to the passage 33, by way of the cavity 34 in the emergency slide valve, is also closed off. Further, as the emergency slide valve 7 operates to emergency position, it uncovers the passage 15, so that fluid under pressure also flows from the emergency valve chamber to the brake cylinder by way of this passage and pipe 15.

In effecting an emergency application of the brakes, the straight air pipe 32 and pipe and passage 35 are charged with fluid under pressure from the reservoir 17 by way of pipe 18 and the brake valve device in the usual manner, but with the emergency valve in emergency position, the passage 35 will be lapped, so that the pressure in this passage will have no effect upon the brake application.

To release the brakes after an emergency application, the straight air pipe 32 is vented to the atmosphere and fluid under pressure is again supplied to the emergency piston chamber 3 through the emergency pipe 4 and pipe and passage 5. When the pressure of fluid in this chamber becomes substantially equal to the pressure of fluid in the emergency valve chamber 8, as supplied by the reservoir 17, the pressure of the spring 27 causes the emergency piston to operate to move the emergency slide valve 7 downwardly to its release position. As this slide valve is being returned to its release position, the communication of the valve chamber 8 and the passage 33, by way of the slide valve port 36 is closed off and communication of the passage 33 with the passage 35 is established through the cavity 34 in the emergency slide valve 7, thus, fluid under pressure is discharged from the application piston chamber 10 to the atmosphere.

Further, as the emergency slide valve is being returned to release position, the brake cylinder passage 15 is lapped by the emergency slide valve, thus closing off the supply of fluid under pressure to the brake cylinder 14, and the passage 29 is connected to the atmospheric passage 31 through the cavity 30 in the slide valve.

Upon the discharge of fluid under pressure from the application piston chamber 10, fluid under pressure in the application slide valve chamber will cause the application piston 11 to operate the application slide valve to release position, in which, the valve 19 will be seated, so that the flow of fluid under pressure from the reservoir 17 to the brake cylinder, past this valve, is closed off, and in which communication from the application piston chamber to the passage 29 is reestablished, so that fluid under pressure is discharged from the brake cylinder to the atmosphere in the same manner as described in connection with the release of the brakes after a service application.

If, in effecting an emergency application of the brakes, the application piston sticks or for any other reason fails to operate the application slide valve 12 to application position, the emergency piston 6 will operate the emergency slide valve 7 to its emergency position, closing off communication from the passage 29 to the atmospheric passage 31 and uncovering the passage 15 so that fluid under pressure is supplied to the brake cylinder. Since the passage 29 is disconnected from the passage 31, fluid supplied to the brake cylinder 14 is not discharged to the atmosphere past the application slide valve 12. In releasing the brakes after such an application, the emergency portion is operated to release position, and since the application portion is in release position, fluid under pressure will be discharged from the brake cylinder 14 to the atmosphere by way of the emergency portion 1 in the same manner as described in connection with the release of the brakes after a service application.

If, in effecting an emergency application, the emergency piston 6 should stick or otherwise fail to operate the emergency slide valve 7 to emergency position, fluid under pressure will be supplied to the application piston chamber 10 from the straight air pipe 32, by way of pipe and passage 35, cavity 34 in the emergency slide valve 7 and passage 33, and the pressure of fluid thus supplied to the chamber 10 causes the application portion to operate to close the communication from the application valve chamber 13 to the passage 29 and to supply fluid under pressure from the reservoir 17, in the same manner as described in connection with the effecting of a service application. The release of the brakes after such an emergency application is accomplished in the same manner as the release after a service application.

It will here be noted that, since the atmospheric connection from the brake cylinder is controlled by both the emergency portion 2 and the application portion 1, the piston of either one of said portions may fail to function to control the brakes in emergency, and the other one will function to supply and release fluid under pressure to and from the brake cylinder, thus reducing to a minimum the possibility of the supply of fluid under pressure being unintentionally vented to the atmosphere or closed off in effecting an emergency application of the brakes.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake equipment, the combination with a brake cylinder, of a valve device comprising an application portion and an emergency portion, each of said portions being operative to supply fluid under pressure to the brake cylinder independent of the other in effecting an emergency application of the brakes.

2. In a fluid pressure brake equipment, the combination with a brake cylinder, of a valve device comprising an application portion and an emergency portion, each of said portions being operative to supply fluid under pressure to the brake cylinder independently of the other in effecting an emergency application of the brakes, and both portions being operative to establish communication through which fluid under pressure is discharged from the brake cylinder.

3. In a fluid pressure brake, the combination with a brake cylinder, of an emergency valve device having an emergency portion and an application portion operative to control the application and release of the brakes, said emergency portion being operative to effect an emergency application and the release of the brakes in the event of the failure of the application portion to operate to application position in effecting an emergency application of the brakes.

4. In a fluid pressure brake, the combination with a straight air pipe and a brake cylinder, of an emergency valve device having an application portion operative by fluid under pressure supplied through said straight air pipe to supply fluid under pressure to said brake cylinder and operative upon the venting of fluid under pressure from the straight air pipe for releasing fluid under pressure from the brake cylinder and also having an emergency portion normally establishing communication through which fluid under pressure, discharged from the brake cylinder, through said application portion, is discharged to the atmosphere.

5. In a fluid pressure brake, the combination with a straight air pipe and a brake cylinder, of an emergency valve device having an application portion operative by fluid under pressure supplied through said straight air pipe to supply fluid under pressure to said brake cylinder and operative upon the venting of fluid under pressure from the straight air pipe for releasing fluid under pressure from the brake cylinder and also having an emergency portion normally establishing communication through which fluid under pressure, discharged from the brake cylinder, through said application portion, is discharged to the atmosphere, said emergency portion being operative to close said communication in effecting an emergency application of the brakes.

6. In a fluid pressure brake, the combination with a straight air pipe and a brake cylinder, of an emergency valve device having an application portion operative by fluid under pressure supplied through said straight air pipe to supply fluid under pressure to said brake cylinder and operative upon the venting of fluid under pressure from the straight air pipe for releasing fluid under pressure from the brake cylinder and also having an emergency portion normally establishing communication through which fluid under pressure, discharged from the brake cylinder, through said application portion, is discharged to the atmosphere, each of said portions being operative to prevent the flow of fluid under pressure from the brake cylinder to the atmosphere in effecting an emergency application of the brakes.

7. In a fluid pressure brake, the combination with a brake cylinder, of an emergency valve device having an application portion and an emergency portion adapted to establish communication from said brake cylinder to the atmosphere when said portions are in their release positions, either of said portions being operative upon effecting an emergency application of the brakes for closing said communication and for supplying fluid under pressure to the brake cylinder.

8. In a fluid pressure brake, the combination with a brake cylinder, of an emergency valve device having an application portion and an emergency portion adapted to establish communication from said brake cylinder to the atmosphere when said portions are in their release positions, said application portion being operative to close said communication and to supply fluid under pressure to the brake cylinder upon effecting a service and an emergency application of the brakes, and said emergency portion being operative to close said communication and supply fluid under pressure to the brake cylinder only upon effecting an emergency application of the brakes.

9. In a fluid pressure brake, the combination with a brake cylinder, of an emergency valve device having an atmospheric passage through which said brake cylinder is adapted to be vented to the atmosphere and having an application portion and an emergency portion, the operation of either of said portions controlling the connecting and disconnecting of said brake cylinder with said passage.

10. In a fluid pressure brake, the combination with a brake cylinder, of an emergency valve device comprising an application portion operative to supply fluid under pressure to the brake cylinder in effecting a service and an emergency application of the brakes and also comprising an emergency portion operative to supply fluid under pressure to the brake cylinder in effecting an emergency application of the brakes only.

11. In a fluid pressure brake, the combination with a reservoir normally charged with fluid under pressure and a brake cylinder, of an emergency valve device comprising an application portion and an emergency portion, said application portion comprising a valve operative to supply fluid under pressure from said reservoir to the brake cylinder and pressure sensitive means for operating said valve, and said emergency portion comprising a valve operative in effecting an emergency application only of the brakes for also supplying fluid under pressure from said reservoir to the brake cylinder, and pressure sensitive means for controlling the operation of the last mentioned valve.

12. In a fluid pressure brake, the combination with a brake cylinder, of an emergency valve device having an application portion and an emergency portion normally connecting the brake cylinder to the atmosphere, said application portion comprising a poppet valve operative to supply fluid under pressure to the brake cylinder to effect an application of the brakes, a slide valve operative to close the connection from the brake cylinder to the atmosphere, and a piston subject to the pressure of fluid for simultaneously operating said valves, and said emergency portion comprising a valve operative to also close the connection from the brake cylinder to the atmosphere and to also supply fluid under pressure to the brake cylinder, and a piston for operating the last mentioned valve.

In testimony whereof I have hereunto set my hand, this 28th day of March, 1929.

JOSEPH C. McCUNE.